United States Patent [19]

Krause

[11] Patent Number: 4,928,792

[45] Date of Patent: May 29, 1990

[54] JOINT FOR LADDERS

[75] Inventor: Gunther Krause, Alsfeld, Fed. Rep. of Germany

[73] Assignee: Krause Werk GmbH & Co. KG, Fed. Rep. of Germany

[21] Appl. No.: 267,147

[22] Filed: Nov. 4, 1988

[30] Foreign Application Priority Data

Nov. 4, 1987 [DE] Fed. Rep. of Germany ....... 3737295

[51] Int. Cl.[5] .......................... F16C 11/00; E06C 7/50

[52] U.S. Cl. ....................................... 182/163; 403/93; 16/332

[58] Field of Search .................... 182/163, 24; 403/93; 16/332

[56] References Cited

U.S. PATENT DOCUMENTS

| | | | |
|---|---|---|---|
| 3,955,740 | 5/1976 | Schuh | 182/163 |
| 4,540,306 | 9/1985 | Wang | 182/163 |
| 4,645,371 | 2/1987 | Wang | 182/163 |
| 4,770,559 | 9/1988 | Yoo | 182/163 |
| 4,824,278 | 4/1989 | Chang | 182/163 |

FOREIGN PATENT DOCUMENTS 0090198 3/1983 European Pat. Off. .

*Primary Examiner*—Reinaldo P. Machado
*Attorney, Agent, or Firm*—Jones, Tullar & Cooper

[57] ABSTRACT

In a multi-purpose ladder of the invention there are disposed on bores (30) in the left and right halves (8, 9) of a second joint element (5) curved recesses (39), not shown here and shaped corresponding to the pivot movement of an operating lever (40), for containing bearings (31) of a release lever (32). Arms (33) of the release lever (32), which cooperates with the operating lever (40), are connected with each other by means of a bar (34) having a recess (35). Protrusions (37) are formed at bearings (31) of the release lever (32) by deep drawing of side wall portion of the arms (33). A cam (42) of a first elbow (41) of the operating lever (40) can be inserted into the bearings (31), the operating lever (40) being securely guided by the recess (35) in the bar (34). The cam (42) comprises an upper semicircular part (43) and a key bit (44), not shown here, the semicircular part (43) having an oblique surface (43*a*) and the key bit (44) an oblique surface (44*a*) at a front face (45) of the cam (42). The key bit (44) has key surfaces (47) extending across the entire length of the key bit (44).

9 Claims, 3 Drawing Sheets

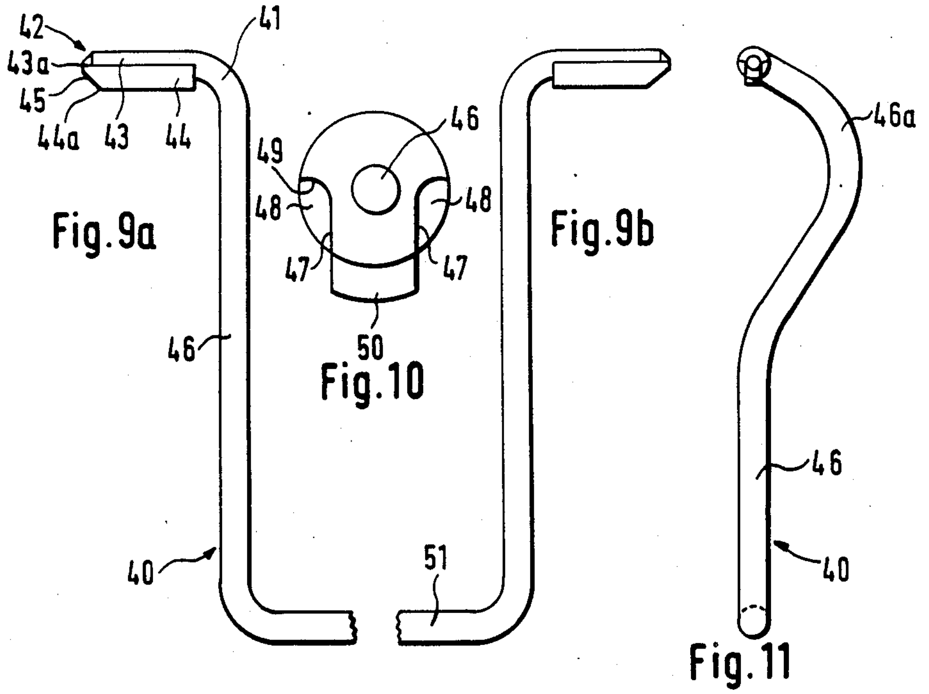
Fig.9a
Fig.10
Fig.9b
Fig.11
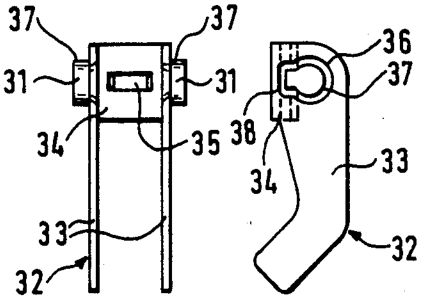
Fig.5
Fig.6
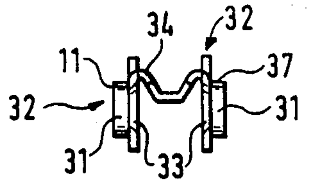
Fig.7

JOINT FOR LADDERS

BACKGROUND OF THE INVENTION

The invention relates to a foldable multi-purpose ladder, and more particularly to a ladder having joints lockable in a plurality of operational positions.

Foldable multi-purpose ladders of the type cited above are already known. A foldable multi-purpose ladder is described in European Patent 0 090 198 in which the uprights are connected by joints arranged in pairs and lockable in several operational positions. The joints each have first and second joint elements pivotable around a common joint axis with each element consisting of left and right halves. The joint elements include guide portions which are insertable into hollow ladder uprights. The first joint element has a double-shell detent wheel which is concentric to the joint axis and which has in the area of its circumference radially extending grooves distributed in accordance with the operating positions, into which a spring-loaded detent piece can extend. The detent piece is longitudinally movable on the second joint element which surrounds the first joint element.

The detent piece can be lifted out of the respective grooves of the detent wheel by means of a release lever, pivotably disposed in bore holes in the left and right half of the second joint element. An operating lever, having arms connected by an eccentrically located bar, includes bore holes designed as bearings for receiving the release lever which also extends into the bore holes of the second joint element. The release levers of the pair of joint elements associated with the two uprights are connected with each other by means of a U-shaped operating bar. The detent piece has a locking bolt which extends approximately across the width of the second joint elenment and which is guided in a recess in the sidewalls of the second joint element. The detent piece has an adjoining guide member, the height of which is only slightly smaller than the clearance of the second joint element, but the width of which is larger than the width of the recess and which has a guide element for a pressure spring. The recesses in the side walls are each wider than the width of the locking bolt and form contact surfaces, or shoulders, which maintain the locking bolt in its released position. In the same manner the detent wheel with the grooves has a cam located next to the grooves which forms a stop face for the locking bolt of the detent piece.

Although this foldable multi-purpose ladder is of simple construction and is easy and safe to operate, it has the disadvantage that, if considerable force is exerted by the operating lever on the release lever, in particular the edges of the bearings provided on the bore holes of the arms of the release lever will be deformed, so that the secure support of the operating lever in the bearings of the release lever can no longer be assured.

SUMMARY OF THE INVENTION

It is therefore an object of the invention to provide a foldable multi-purpose ladder having first and second joint elements in which bore holes are provided in the left and right halves of the second joint element. The release lever inserted in the joint elements, its bearings, as well as the operating lever cooperating with the release lever, are designed in such a way that, even if increased force were to be exerted by the operating lever on the release lever, such a force can be absorbed by the first and second halves of the second joint element. In this way the edges of the protrusions of the release lever which serve as bearings can no longer be deformed and the support of the operating lever in the release lever is assured.

The foregoing object is attained, in accordance with the invention, through the provision of an operating lever which includes a key bit which engages the release lever in the joint for lifting the spring-loaded detent piece. The key bit includes a cam which engages an enlongated recess in an eccentrically located bar extending between the two legs of the release lever and secured to the legs for operation of the release lever by the operating lever. The two arms of the release lever are formed with protrusions which extend outwardly and into corresponding bore holes in the two halves of the ladder joint element and form bearing surfaces in the bore holes. The bore holes have outwardly extending recesses which receive radially outwardly extending ridges on the bearing surface which are movable in the bore hole recesses to engage one end or the other of the recesses, whereby the bearings have a limited pivot operation with respect to the joint element.

The advantages secured by means of the invention in general consist in that the operating lever, according to the invention in the form of a release arm and cooperating with the release lever, is secured in the release lever. Even when greater force is exerted on the operation lever then edges of the protrusions of the release lever which serve as bearings can no longer be deformed, because these forces are taken up by the first and this is accomplished, as indicated above, by providing the operating lever with a first elbow portion which carries a cam having a key bit which extends into correspondingly formed pear shaped bearing protrusions on the release lever as well as into a correspondingly formed recess in the reinforcing bar which extends between the two legs of the release lever. The key bit is securely maintained in position by the recess in the bar after its engagement. Curved recesses disposed in the left and right halves of the second joint element are shaped to limit the pivot motion of the operating lever and are used to guide the release lever bearing surfaces.

BRIEF DESCRIPTION OF THE DRAWINGS

Exemplary embodiments of the invention are shown in the drawing and are described in detail below.

FIG. 5 is an enlarged top view of the release lever shown in FIGS. 2 and 3 with its protrusions used as bearings and with a reinforcing bar with recesses which connects the arms;

FIG. 6 is a right lateral view of FIG. 5 illustrating an angled release lever arm and the eccentrically located reinforcing bar of the release lever, illustrating the protrusions forming the bearings for the release lever, the bearings being pear-shaped in cross section;

FIG. 7 is a top view of the release lever shown in FIG. 5 illustrating the eccentrically located and sharply angled reinforcement bar on which the arms of the release lever are formed;

FIGS. 9*a* and 9*b* are top views of the operating lever of the invention, the first elbows of which have cams for insertion into the release lever and the second elbows of which connect the two first elbows of second, parallel arranged joints;

FIGS. 10 is an enlarged front surface of the cam of the operating lever, and

FIG. 11 is a lateral view of the operating lever with an angled shaft portion.

DESCRIPTION OF PREFERRED EMBODIMENT

Figure 1:
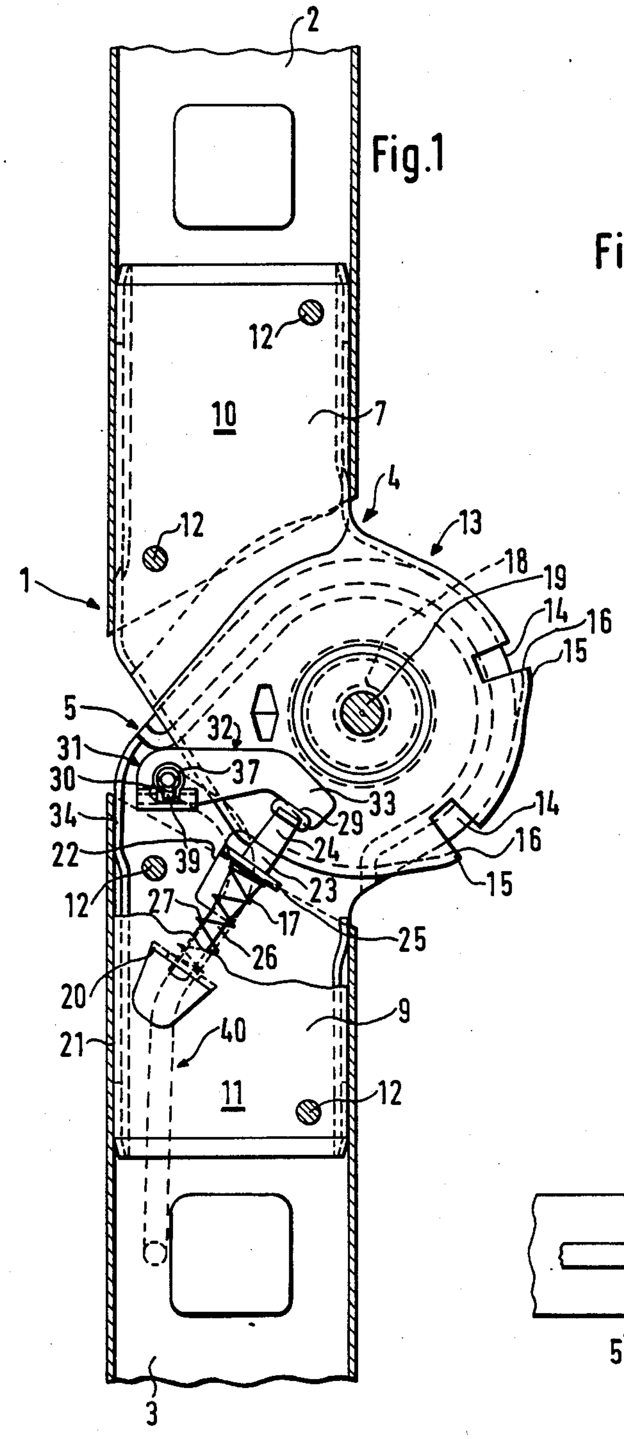
FIG. 1 is a right-side lateral view partially in section of a joint of a foldable multi-purpose ladder of the invention with bore holes in the left and right halves of a second joint element for insertion of bearings of a release lever and with a detent piece.

FIG. 1 illustrates in a right, partially sectional lateral view a joint 1 of a foldable multi-purpose ladder of the invention. Tube-shaped uprights 2, 3 which are formed by bending of sheets consisting of steel or aluminum by means of a deep-drawing process are slideable onto the joint 1.

The joint 1 comprises a first joint element 4 and a second joint element 5, the first and second joint elements 4, 5 each being composed of left and right halves 6, 7, or 8, 9. The left and right halves 6, 7, or 8, 9 of the two joint elements 4, 5 are also deep-drawn from sheet metal and have guide elements 10, 11, the outer shapes of which correspond to the inside clearance of the uprights 2, 3.

The right joint element 4 can be inserted into the upright 2 with the guide element 10 and the second joint element 5 can be inserted into the upright 3 with the guide element 11, as shown in FIG. 1. Securing of the upright 2 by means of the guide element 10 or of the upright 3 by means of the guide element 11 is done with the aid of rivets 12.

As also shown in FIG. 1, a known detent wheel 13 has an axis perpendicular to the plane of the drawing. The wheel is narrower (in the axial direction) than the guide element 11, and is formed as one piece on the guide element 10 of the first joint element 4. The detent wheel 13 has a plurality of radial grooves 14 which are disposed at a set angular distance, so that the uprights 2, 3 can be adjusted in relation to each other at positions of 90°, 135° and 180°.

Cams 15 are formed on one side of each of the grooves 14 of the detent wheel 13, each cam having a stop face 16. The cams 15 are each formed on the same side of the grooves 14 so that, a s will be explained below, they cooperate with a known detent piece 17 which provides locking only in one rotational direction. In its center the detent wheel 13 has an axial bore 18 to receive the joint shaft 19. The wall of the detent wheel 13 is again recessed in the area of the bore 18, which results in an improved guidance of the second joint element 5.

In the same way that the first joint element 4 has left and right guide elements 10 which are slideable into the upright 2, the second joint element 5 has left and right guide elements 11, which can be inserted into the upright 3 and can be fixed therein by means of the rivets 12.

A known bracket 20 is formed on the guide element 11 by stamping and inward bending. The bracket 20 has a bore hole 21 which is used to guide a detent piece 17. Furthermore, the guide element 11 has a further recess 22 on each of the two opposite sides, the recesses receiving a detent guide element 25. The recesses cooperate with bracket 20 to guide the detent piece 17 toward and away from the detent wheel 13. A latching shoulder 23 is formed in recess 22 and receives the detent piece to hold it out of contact with the detent wheel grooves 14 when the detent wheel is released to allow rotational motion of the joint 1. As shown in FIG. 1, the shoulder 23 is disposed in such a way in relation to the grooves 14 that it is located above the upper limit of the groove 14, but below the top of stop face 16 of the cam 15, so that in one rotational direction the stop face 16 cooperates with a known locking bolt 24 of the detent piece 17.

The second joint element 5 has, the same as the first joint element 4, a coaxial bore 18 for the joint shaft 19. Element 5 is recessed in the area of the bore 18 so that by means of this and together with the detent wheel 13 a guide surface is formed in the area of the bore 18 which , in addition to the joint shaft 19, results in centering of the two joint elements 4 and 5 so that they can rotate with respect to each other about shaft 19.

As previously recited, a generally U-shaped detent piece 17 consists of the locking bolt 24 which enters the grooves 14 of the detent wheel 13. A guide element 25 is disposed on the locking bolt 24 and extends between the two halves of the joint element 5 and into the recesses 22. A guide bar is mounted on element 25 and is inserted into the hole 21 of bracket 20. The bar 26 is used as a guide for a pressure spring 27 disposed between the bracket 20 and the guide element 25. The spring 27 pushes the locking bolt 24 in the direction of the grooves 14. The width of the locking bolt 24 as viewed in FIG. 1, is somewhat less than the width W of the grooves 14, while the height of the lcoking bolt 24 (in a direction perpendicular to the plane of the page) is the same or a little less than the distance between the two halves of the guide element 11 of the second joint element 5. Lateral guidance of the two halves of the locking bolt 24 is obtained by means of the side walls 28 of the guide element 11 of the second joint element 5. A semicircular protrusion 29 is formed on the locking bolt 24 and extends outside the walls 28 to serve as a further guide for the locking bolt and is designed to protect the user from injury when operating the detent piece 17.

As will be shown in even greater details than in FIG. 1, bores 30 with curved recesses 39 disposed thereon are provided in the right and left halves 8, 9 of the second joint element 5. In accordance with an embodiment of the invention the bores 30 and recesses 39 receive protrusions 37 which are formed on a release lever 32. The lever 32 includes a pair of parallel arms 33 having at one end aligned bore holes 36 (see FIGS. 3 and 4) which preferably are produced during the formation of protrusions 37. These protrusions may be formed, for example, by means of deep drawing the material of the arms 33 in a direction outwardly of the release lever 32 (see FIG.

5). The protrusions 37 serve as bearings, generally indicated at 31, with each protrusion including a central generally cylindrical portion and a radial shoulder portion 38 (see FIG. 4) making the protrusion generally pear-shaped in cross section with an axial bore of similar cross-sectional shape. These extrusions extend through the bores 30 when the release lever 32 is assembled between the two halves of the joint element 5.

Figure 8:
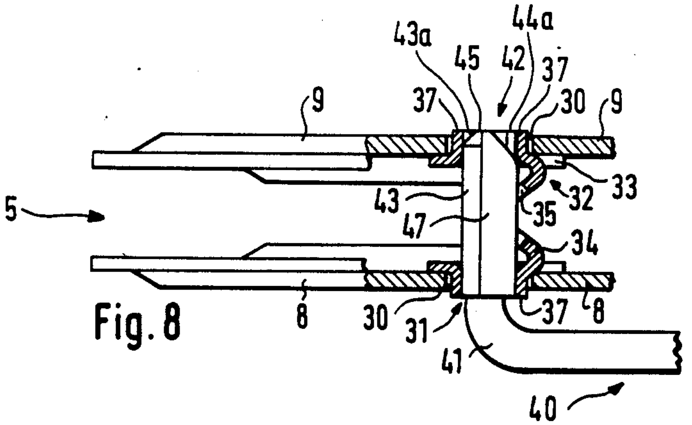
FIG. 8 is an enlarged partial top view, partially in section, of the left and right halves of the second joint part with the cam of the first elbow of the operating lever inserted into the protrusions of the bearings of the release lever.

The arms 33 of the release lever 32 are connected by a known eccentrically located reinforcement bar 34, the bar 34 having a recess 35 (FIGS. 5 and 8) according to the invention which, in accordance with an embodiment of the invention, extends paraxially to parallel to the axis common to protrusions 37. As the protrusions 37, which are pear-shaped in cross section and used as bearings 31 for the release lever 32. As will be shown below, the recess 35 in the bar 34 of the release lever 32 offers a secure support for a key bit 44 (FIG. 8) of an operating lever 40 (see FIGS. 9 to 11) when the lever extends through the protrusions, as illustrated in FIG. 8.

In accordance with the invention, the front shoulder portions 38 of protrusions 37 are guided in the respective curved recesses provided in the side walls of the left and right halves 8, 9 of the second joint element 5 and more along the recesses when the operating lever 40 is pivoted. As will be explained below, the bar 34 eccentrically connecting the arms 33 is sufficiently angled (see FIG. 8) so that the recess 35 in the bar 34 can offer secure support for the key bit 44 of the operating lever 40.

Figure 2:
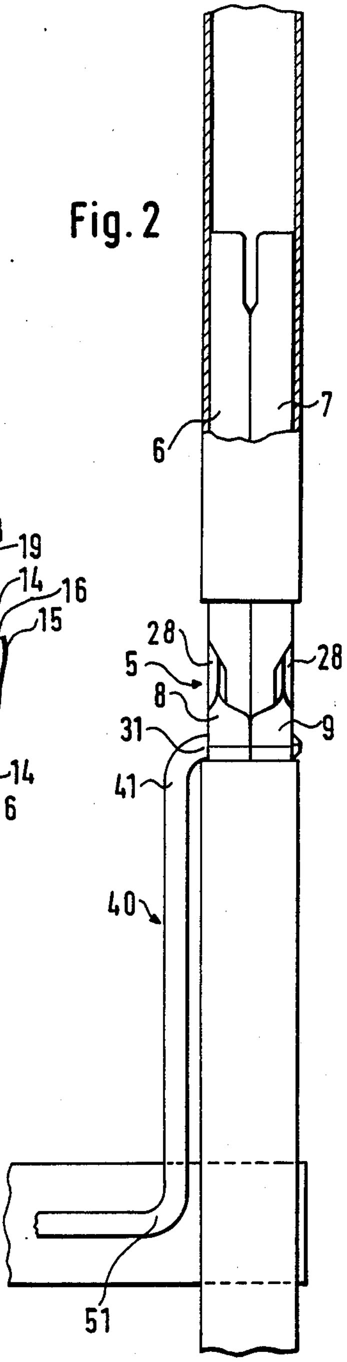
FIG. 2 is a top view of the joint shown in FIG. 1 wherein the first elbow of the operating lever is shown inserted into the bearings of the release lever, not shown.

FIG. 2 shows a top view of the joint 1 for the foldable multi-purpose ladder of the invention illustrated in FIG. 1. The operating lever 40, which will later be described in detail and which is used as a release arm, is shown inserted with a first elbow 41 into a central aperture through bearings 31, not shown here, of the release lever 32. Since the components of the joint 1 have previously been sufficiently described, further explanations are not needed here.

Figure 3:
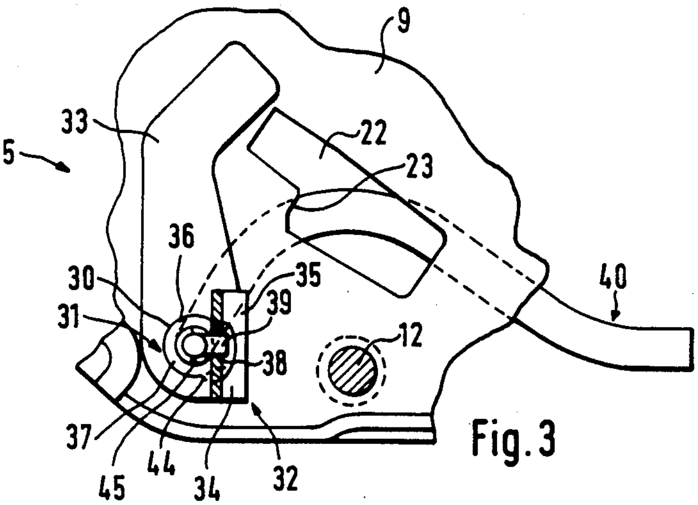
FIG. 3 is an enlarged partial view of FIG. 1 with parts of the second joint element removed, in which bore holes with curved recesses formed thereon are disposed, in which are held correspondingly formed protrusions of the bearings of the release lever.
Figure 4:
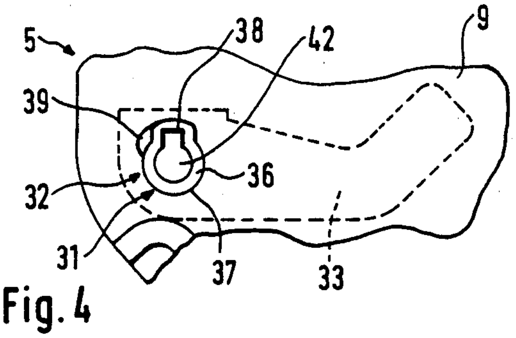
FIG. 4 is an enlarged partial view of FIG. 1 with parts of the second joint element removed as in FIG. 3, in accordance with which the release lever can be pivoted by the elbow portion of the operating lever into a desired position within the curved recesses.

FIGS. 3 and 4 show enlarged partial lateral views, with parts removed, of halves of the second element 5. As described, the bore holes 30 with curved recesses 39 disposed thereon are provided in the joint element 5, in which are supported the similarly formed pear-shaped protrusions 37 of the bearings 31 of the release lever 32. The protrusions 37 have a front part 38 which extends into the recesses 39 and is rotatable therein when release lever 32 is pivoted by means of the operating lever 40. The operating lever is inserted into the aperture through bearings 31 to engage the release lever.

Clearly shown in FIG. 3 is the bar 34, located eccentrically to the bearings 31 and connecting the arms 33 of the release lever 32, which has in its center a recess 35 in which the key bit 44 of the operating lever 40 can be securely guided after it has been inserted. The bar 34 prevents deformation of the edges of the protrusions 37 of the release lever 32, even if increased force is exerted on the release lever 32 by means of the operating lever 40, the latter no longer can deform the edges of the protrusions 37 of the release lever 32, used as bearings, because this force can be taken up by the left and right halves 8, 9 of the second joint element 5.

Also clearly shown in FIG. 3 is a front face 45 of the first elbow 41 of the operating lever 40 inserted in the bore of the bearings 31 of the release lever 32. FIG. 4 illustrates a pivoted position of the release lever 32, which can be attained after insertion of the cam 42 of the operating lever 40 into the central bore of the pear-shaped protrusions 37 of the bearings 31, with the cam 42 extending into the interior aperture formed by the shoulder portion 38. The operating lever then can pivot the front part 38 of the protrusions 37 in the recess 39, thereby rotating the lever 32. The ends of the recess 39 act as stops to limit the rotation of the levers 40 and 32.

FIGS. 5 to 7 show particularly clearly in enlarged top and lateral views of the already described components of the release lever 32. The arms 33 of the release lever 32 are connected in one piece by the bar 34, the recess 35 extending in the bar 34 parallel to the axis of protrusions 37, used as bearings 31 for the release lever 32. As previous by noted, the protrusions 37 are formed by deep drawing in the direction of the bearings of a part of the side walls of the arms 33 of the release lever 32. The eccentric position of the bar 34 with respect to the protrusions 37 fixed on the arms 33 is also particularly clearly visible in FIG. 6. The eccentrically located and sharply angled bar 34, on which the arms 33 of the release lever 32 are fixed, is shown in top view in FIG. 7.

FIG. 8 shows an enlarged partial top view, partially in section, of the left and right halves 8, 9 of the second joint element 5 with the cam 42 of the first elbow 41 of the operating lever 40 of the invention inserted into the central bore of protrusions 37 of the bearings 31 of the release lever 32. As already explained, the operating lever 40 is in the form of a release arm and is used for lifting the spring-loaded detent piece 17 provided in the second joint element 5. The cam 42 provided on the first elbow 41 of the operating lever 40, in accordance with the invention, has a key bit 44 (FIGS. 9*a*/9*b*) with two opposed key surfaces 47 (FIG. 10) which extend across almost the entire length of the key bit 44. In accordance with an embodiment of the invention, the cam 42 of the elbow 41 comprises an upper semicircular part 43 with an oblique surface 43*a* and the key bit 44, extending over almost the entire length of the elbow 41, which also has an oblique surface 44*a*. The key surfaces 47 of the key bit 44 can be securely guided in the centrally disposed recess 35 of the bar 34.

In accordance with a further embodiment of the invention the key surfaces 47 have a height which is greater than the radius of the upper semicircular part 43, so that the key bit 44 extends beyond a shaft 46 of the operating lever 40 and in this manner can extend completely and securely seated into the recess 35 of the release lever 32. The key bit 44 has a width which is approximately equal to the height of the upper semicircular part 43 of the cam 42.

FIGS. 9*a*/9*b* are top views of the operating lever 40 of the multi-purpose ladder of the invention, the first elbows 41 of which have the cams 42 for insertion into the release lever 32 and the second elbows 51 of which connect the two first elbows 41 of two parallel disposed joints 1. As already described, the cam 42 comprises the upper semicircular part 43 and the key bit 44, which extends with its key surfaces 47 beyond the shaft 46 and in this way can securely enter the recess 35 of the release lever 42, as described. At the front face 45 the upper semicircular part 43 has an oblique surface 43*a* and the key bit 44 an oblique surface 44*a*, so that the cam 42 of the first elbow 41 of the operating lever 40 can be easily inserted into the protrusions 37 used as bearings 31.

FIG. 10 shows the enlarged front face 45 of the cam 42 of the operating lever 40 where, in an embodiment of the invention, the key bit 44 has protrusions 49 and a rounded base surface 50 opposite the upper semicircular part 43.

FIG. 11 shows, as do FIGS. 1 and 3, the operating lever 40 with curved shaft part 46a in accordance with an embodiment of the invention in a lateral view.

The operation of the foldable multi-purpose ladder is, as is generally known, as follows. When the operating lever 40 is lifted, the release lever 32 moves downward and presses with the contact surface against the locking bolt 24 of the detent piece 17 and pushes it out of the grove 14. By the movement of the release lever 32 the detent piece 17 and with it the locking bolt 24 are also displaced in the direction towards the bearings 31 of the release lever 32, so that detent piece 17 abuts against the contact surface 23. Following this, the release lever 32 can be released and the joint 1 can be rotated. If this rotation is performed in a clockwise direction in FIG. 1, the upright 2 can be brought into a position parallel to that of the upright 3 without fear of engagement of the locking bolt 24 in one of the grooves 14. If, however, the upright 2 is rotated in a counterclockwise direction in FIG. 1, the stop face 16 of the cam 15 touches the locking bolt 24 and displaces it away from its contact surface 23 so that it engages the groove 14 because of the force of the pressure spring 27 and in this manner prevents the movement of the uprights 2, 3 in respect to each other.

I claim:

1. An improved joint for connecting the uprights of a foldable multipurpose ladder, comprising:

- first and second joint elements pivotable around a common axis, each element consisting of left and right halves secured together with said first joint element being located between the halves of said second joint element;
- detent-receiving grooves formed on the circumference of said first joint element, and distributed in accordance with the operating positions of said ladder, whereby said first joint element comprises a double shell detent wheel;
- detent means mounted within said second joint element and movable into and out of engagement with a selected one of said grooves;
- first and second bores coaxially formed in the left and right halves of said second joint, said first and second bores including aligned curved recesses;
- a release lever including a pair of spaced, parallel arms having first ends and second ends, said first ends including means mounting said release lever for pivotal motion in said first and second bores of said second joint element and said second ends engaging said detent means whereby pivotal motion of said release lever will retract said detent means out of a groove in said detent wheel, said means mounting said release lever including first and second protrusions extending from said release lever into corresponding bores in first and second halves, respectively, of said second joint element, said protrusions having generally cylindrical coaxial apertures and including radially extending shoulder portions forming offset recesses in said apertures, said protrusions forming bearings for said release lever to permit pivotal motion of said release lever in said bores with said shoulder portions of said protrusions extending into, and movable in, said curved recesses;
- eccentrically located bar means interconnecting said first ends of said release lever arms;
- slot means in said bar means;
- an operating lever for pivoting said release lever to lift said detent means, said operating lever including a shaft portion external to said joint elements and an elbow portion including a key bit having a cam, said key bit extending into said coaxial aperture of one of said protrusions, through said release lever, and into the coaxial aperture of the other of said protrusions with said cam engaging said offset recesses thereof and engaging said slot means in said bar between said release lever arms, whereby rotation of said operating lever rotates said key bit and cam to thereby rotate said release lever, and wherein said curved recesses limit the rotational motion of said protrusions to thereby limit the rotation of said release lever.

2. The improved joint of claim 1, wherein said protrusions are generally pear-shaped in cross-section, and are formed integrally with the respective first and second arms of said release lever.

3. The improved joint of claim 2, wherein said slot means in said bar means extends parallel to the common axis of said protrusions.

4. The improved joint of claim 3, wherein said shoulder portions are guided in said curved recesses.

5. The improved joint of claim 4, wherein said bar means is angled between said release lever arms, whereby said slot provides a secure seat for said cam.

6. The improved joint in claim 5, wherein said elbow portion includes a semicircular portion carrying said key bit and extending substantially the entire length of said elbow portion of said operating lever, said cam portion of said key bit and said semicircular portion terminating in oblique surfaces.

7. The improved joint of claim 6, wherein said key bit includes first and second opposed key surfaces forming a cam extending the length of said key bit, said cam extending outwardly from said elbow portion to engage said slot in said bar means.

8. The improved joint of claim 7, wherein said operating lever includes a curved shaft portion adjacent said elbow portion.

9. The improved joint of claim 8, wherein said operating lever includes means interconnecting a joint in one leg of a ladder with a similar joint in a second, parallel leg of the ladder.

* * * * *